(12) United States Patent
Kramer

(10) Patent No.: US 9,499,425 B2
(45) Date of Patent: Nov. 22, 2016

(54) METHOD OF FABRICATING A MULTI-TONE GLASS VESSEL FROM AT LEAST TWO DISPARATELY-COLORED GOBS

(71) Applicant: Grupo Pavisa, S.A. de C.V., Naucalpan Estado de Mexico (MX)

(72) Inventor: Michael Arnold Albert Kramer, Delegacion Miguel Hidalgo, C.P. (MX)

(73) Assignee: Grupo Pavisa, S.A. de C.V., Naucalpan Estado de Mexico (MX)

( * ) Notice: Subject to any disclaimer, the term of this patent is extended or adjusted under 35 U.S.C. 154(b) by 0 days.

(21) Appl. No.: 14/740,798

(22) Filed: Jun. 16, 2015

(65) Prior Publication Data

US 2016/0052816 A1  Feb. 25, 2016

Related U.S. Application Data

(63) Continuation-in-part of application No. 13/136,546, filed on Aug. 4, 2011, now abandoned.

(30) Foreign Application Priority Data

Aug. 4, 2010 (MX) .................. MX/e/2010/048024

(51) Int. Cl.
   *C03B 9/14* (2006.01)
   *C03B 9/34* (2006.01)
   *G06Q 30/02* (2012.01)

(52) U.S. Cl.
   CPC ............ *C03B 9/14* (2013.01); *C03B 9/342* (2013.01); *C03B 9/344* (2013.01); *G06Q 30/02* (2013.01); *G06Q 30/0211* (2013.01)

(58) Field of Classification Search
   CPC .............. C03B 9/31; C03B 9/14; C03B 9/42
   See application file for complete search history.

(56) References Cited

U.S. PATENT DOCUMENTS

| 1,770,335 | A | * | 7/1930 | Fuwa | C03B 9/12 65/145 |
| 1,848,467 | A | * | 3/1932 | Rmerson | C03B 9/31 65/156 |
| 1,870,363 | A | * | 8/1932 | Jenkins | C03B 9/02 65/46 |
| 2,183,961 | A | * | 12/1939 | Fischer | C03B 9/31 65/46 |
| 2,538,935 | A | * | 1/1951 | Erickson | C03B 9/02 65/54 |
| 2,802,309 | A | * | 8/1957 | Brune | C03B 9/1932 215/12.2 |
| 2,926,459 | A | * | 3/1960 | Pinotti | C03B 19/04 65/71 |

(Continued)

FOREIGN PATENT DOCUMENTS

| JP | 58009831 A | * | 1/1983 |
| JP | 09040429 A | * | 2/1997 |
| JP | 2002179428 A | * | 6/2002 |

*Primary Examiner* — Jason L Lazorcik
(74) *Attorney, Agent, or Firm* — Louis J. Franco; Law Office of Louis J. Franco

(57) ABSTRACT

A method of fabricating a multi-tone glass vessel includes depositing a molten-glass first gob of a first glass color into a mold having a lower end and an upper end. An initial quantity of gas is injected into the mold in order to form a gob cavity within the first gob and cause the first gob to partially inflate and expand toward the upper end of the mold. A molten-glass second gob of a second glass color is deposited into the mold over the partially-inflated first gob. The introduction of a second quantity of gas into the gob cavity within the mold forms the first and second gobs into a single, multi-tone vessel of predetermined shape.

11 Claims, 4 Drawing Sheets

(56) References Cited

U.S. PATENT DOCUMENTS

| | | | | |
|---|---|---|---|---|
| 4,260,405 A * | 4/1981 | Ambrogi | | A47J 36/04 65/42 |
| 4,457,771 A * | 7/1984 | Ambrogi | | C03B 5/12 264/148 |
| 4,740,401 A * | 4/1988 | Barkhau | | C03B 5/031 428/34.6 |
| 2005/0056057 A1* | 3/2005 | Marcolin | | C03B 11/14 65/48 |
| 2012/0036894 A1* | 2/2012 | Kramer | | C03B 9/165 65/72 |

* cited by examiner

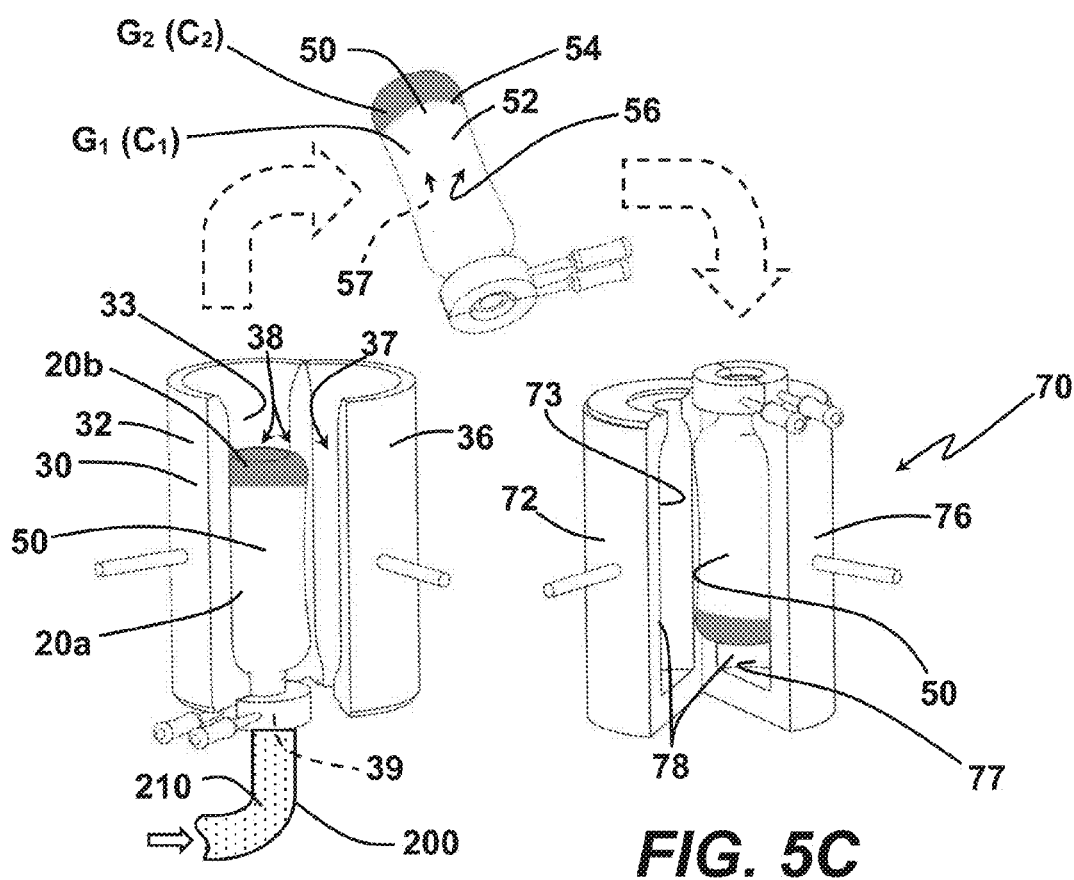
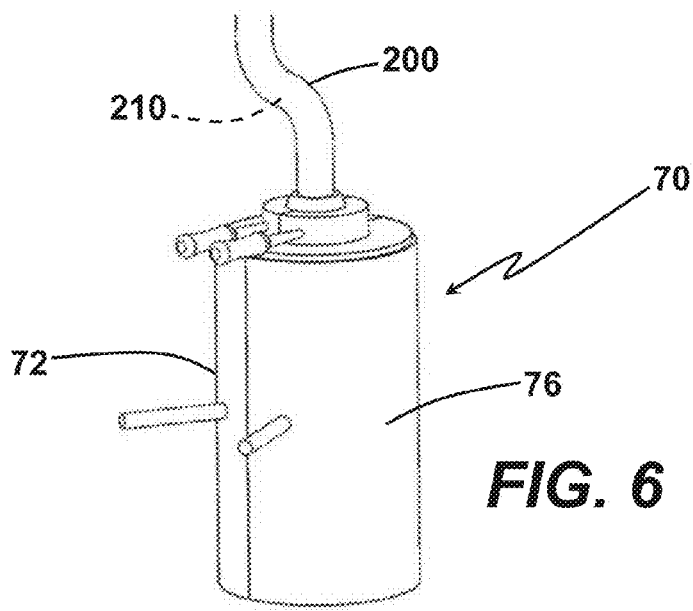

METHOD OF FABRICATING A MULTI-TONE GLASS VESSEL FROM AT LEAST TWO DISPARATELY-COLORED GOBS

CROSS-REFERENCE TO RELATED APPLICATIONS/DOMESTIC AND FOREIGN PRIORITY CLAIMS

The present application is a continuation-in-part of U.S. application Ser. No. 13/136,546 filed Aug. 4, 2011 under the title "METHOD OF FABRICATING A MULTI-TONE GLASS VESSEL FROM AT LEAST TWO DISPARATELY-COLORED GOBS." Application Ser. No. 13/136,546 was co-pending with the present application on the date the present application was filed.

Previously filed Non-provisional application Ser. No. 13/136,546 was based on, and claimed the benefit of the filing date of, Mexican Patent Application Folio No. MX/E/2010/048024 filed Aug. 4, 2010 and entitled PROCESO DE FORMACION DE UNA CAVIDAD EN LA PARTE INFERIOR DE CONTENEDORES Y BLOQUES DE VIDRIO. The present application also claims the benefit of the filing date of Mexican Application Folio No. MX/E/2010/048024 through Non-provisional application Ser. No. 13/136,546. The entirety of the disclosures of the previous non-provisional and Mexican applications, including the drawings, are incorporated herein by reference as if set forth fully in the present application.

BACKGROUND

The formation of glass into useful and artistic objects dates to at least the $4^{th}$ Century BCE. Among the established techniques for forming glass are flow-molding, press-molding and hand-blowing. Hand-blown glass objects are admired for the artistry and skill required to produce them, and the uniqueness of each piece so produced. In hand-blowing glass, a skilled artisan gathers a gob of molten glass about the distal end of a gathering implement. The gathering implement is typically hollow so that, as the artisan manipulates the implement to shape the gob, he can blow air into the gob to create a cavity within the work piece. In this general manner, a glassblower is able to create vessels such as cups, bowls and bottles.

As glass is hand-blown, the artisan might add unique features to the work piece. For example, color might be added by incorporating certain metals or minerals into the glass as it is reheated and worked. The inclusion of such features signifies artistry, skill and uniqueness. However, the very nature of the hand-blowing process renders hand-blown pieces expensive and impractical for use as containers for all but the highest-end products such as fine perfumes and select alcoholic beverages.

Contrasting with the artistry associated with hand-blown glass objects is the rapid mass production of strictly utilitarian objects such as window panes and beverage bottles. Among the goals of manufacturing vessels such as drinking glasses and beverage bottles are rapid reproducibility and uniformity of appearance among units. Of particular importance is uniformity among units in physical dimensions such as opening shape and size in order to facilitate the use of standardized lids, plugs or caps as closures. Accordingly, in the modern era, glass vessels are largely produced by strictly-controlled automated hot pressing and blowing processes. Such processes have the advantage of being relatively inexpensive and invariant, but result in products lacking uniqueness and artistry.

A process for producing a multi-tone glass vessel from at least two disparately-colored molten-glass gobs yields vessels combining the artistry and uniqueness traditionally resulting from hand-blowing with the dimensional reproducibility required for mass production.

SUMMARY

Implementations of the present invention are generally directed to a method of mass-producing consistently-dimensioned, multi-tone (e.g., two-tone) glass vessels from at least two disparately-colored molten-glass gobs while maintaining structural integrity. For purposes of conceptualizing the desired color contrast, it is to be understood that "transparent" or "clear" is regarded as a color throughout the present description and the claims appended hereto. Accordingly, one glass might be transparent, while another at least partially opaque. Although not so limited in scope, among the glass vessels of particular interest are drinking glasses, cups, bowls, decanters, vases, and selectively closeable bottles intended for the containment of products such as perfume and alcoholic beverages, by way of non-limiting example.

In accordance with an illustratively implemented method of making a two-tone vessel of predetermined shape, an "initial" or "first" gob of molten glass of a first color is gathered. In a typical version, the molten-glass first gob is removed from a glass furnace by gathering it about a distal end of an elongated gathering implement such as a rod, tube or gathering iron, by way of example. While still uninflated, the first gob is introduced into a pre-form mold into which—in one implementation—an initial quantity of gas, such as air, by way of non-limiting example, is injected in order to partially inflate and form the initial gob into a rudimentary pre-form vessel. The pre-from mold has a lower end and an upper end opposite the lower end. Moreover, the pre-form mold is vertically oriented, and the lower and upper ends are defined relative to the gravitational field (of Earth), such that molten glass that is introduced through the open upper end thereof is drawn by gravity toward the lower end. In this manner, the introduction (e.g., injection) of an initial quantity of gas through an opening in the lower end of the pre-form mold forms a cavity within the first gob that fills with gas and causes the first gob to expand and rise toward the open upper end of the pre-form mold. It will be appreciated that the end of the "partially-inflated" first gob that is nearest the upper end of the pre-form mold corresponds to what will become the lower end of a finished vessel, while the end of the first gob through which the gas is blown corresponds to what will become an opening in the finished vessel.

Once the partially-inflated first gob has assumed a predetermined shape and size, a molten-glass second gob of a second color, contrasting in color with the first color, is introduced into the pre-form mold over the partially-inflated first gob such that (i) the second gob flows freely and randomly over the partially-inflated first gob under the drawing force of gravity and (ii) the partially-inflated first gob is situated between the second gob and the lower end of the pre-form mold. Steps are taken to ensure that the glass is acceptably distributed within the pre-from mold, but the second gob is distributed somewhat randomly (e.g., not pre-cast or pre-molded) so that its random distribution over a portion of the first gob contributes to a unique appearance of the final product. With the second gob disposed on top of the partially-inflated first gob, additional gas is introduced into the pre-form mold in order to form the first and second gobs into a single pre-form vessel having at least one pre-form vessel wall defining a pre-form vessel exterior surface and a pre-form vessel interior surface defining a pre-form vessel cavity. The quantity of gas blown into the pre-form mold depends, in part, on the desired wall and base thicknesses of the vessel being formed.

In order to more fully appreciate a principal aspect in which selected implementations of the present process differ from previous processes that might otherwise seem similar, some further explanation as to what is meant by introducing the second gob over the partially-inflated first gob such that the second gob flows "freely" and "randomly" over the first gob is warranted. One previous process that, in the absence of further explanation, might seem similar is disclosed in U.S. Publication No. 20050056057 in the name of Marcolin. In Marcolin, a first gob of glass is introduced into the bottom of a mold having a shape pre-defined by a bas-relief cavity, for example. The first gob is poured into the mold such that the glass of the first gob assumes a "negative" configuration to that defined by the bas-relief cavity. The shape assumed by the first gob corresponds to a decoration that will ultimately be adhered, while still hot, to the outer surface of a finished glass vessel. Precise reproducibility of this decorative shape is a critical objective of the Marcolin process so that near-indistinguishability among final products results. Moroever, in Marcolin, the gob of glass first introduced into the mold is in itself no way inflated by the injection of gas.

Subsequently, in Marcolin, a second gob of glass is inserted into the same mold in which the cooling—but still hot—decoration (mold-formed first gob) is situated. The second gob is inserted and deposited on the bottom of the mold and partially on the decoration. The second gob is then formed into what becomes "the body 18" of the overall object being created. For example, where the object being created is a cup 16, paragraph [0054] of Marcolin explains that the crystal glass (i.e., the second gob 15) " . . . cools, solidifies and adheres to the decoration 14, generating the cup 16, which is formed by a body 18 and by the decoration 14 applied to the external surface of the body 18."

To the extent that implementations of the present process can be at all compared to the Marcolin process, the first gob of the present process corresponds to Marcolin's "body 18," while the second gob of the present process corresponds to Marcolin's "decoration 14." These respective correlations are appropriate to the extent that Marcolin's "decoration 14" and the "second gob" of the present process represent adornments that are added to larger "main bodies" that could stand alone without adornment.

Having assigned crude correlations between the first and second gobs of the present process and those of the Marcolin process, the differences in how the second gobs (adornments) are applied to the first gobs (main bodies) in each process can be more clearly described and appreciated. As already explained, an apparent principal objective of Marcolin's process is reproducibility and uniformity of appearance of the adornments (decorations 14) applied to the bodies 18 of the main objects or products resulting from the process. In contrast, various implementations of the present process seek to introduce a unique appearance to each applied adornment. In order to achieve this, the first gob is partially inflated within the open-top mold. As the first gob inflates, the end of the partially-inflated first gob closest to the open upper end of the pre-form mold presents a convex or "bulbous" surface as viewed through the open upper end. This upwardly-facing convex/bulbous surface is not in contact with any portion of the mold. It is onto this surface that a molten (flowable), non-inflated second gob of glass is introduced through the open upper end of the pre-form mold and allowed to flow freely and randomly to create randomized, non-molded flow patterns upon the surface of the partially-inflated first gob. In various versions, the flow of second glass is moved around at random to create randomized patterns of second glass on the partially-inflated first gob. The random manipulation of the source of downwardly flowing second glass relative to the mold may be induced by machine or by hand. The "randomness" and "freeness" of the flows may be analogous to the application of syrup to pancakes or the creation of "funnel cakes," wherein very little to no thought goes into the distribution of the second glass over the partially-inflated gob of the first glass. Most importantly, these flows of second glass that constitute the applied adornment are not pre-formed by a mold (i.e., they are "non-molded") in a manner similar or analogous to the adhered adornments in Marcolin. Whereas, in Marcolin, repeatability and "identity" of the adhered adornments among units produced is a key aim, implementations of the present process actively seek to avoid identity of appearance among the patterns of second glass applied to the first gob/main body of the resulting article, even while striving for repeatability of shape and dimensions.

In one version, when the pre-form vessel, including the randomized patterns of second glass, is sufficiently cool and "self-supporting" to retain its basic shape, including the basic randomized, self-supporting "shape" of the second-glass flow patterns, it is removed, while still hot, from the pre-form mold, and introduced into a finish mold. If required, the pre-form vessel is heated sufficiently to allow final shaping prior to introduction into the finish mold, while care is taken not to deform the pre-from vessel to such an extent that it cannot be processed in the finish mold. With the pre-form vessel disposed within the finish mold, a quantity of gas is injected into the pre-form vessel cavity in order to form the pre-form vessel into a finished vessel having at least one finished vessel wall defining finished vessel exterior and interior surfaces, the later surface further defining a finished-vessel storage cavity. In various implementations, this finish-molding step will cause the second gob to be "smeared" or "pressed" over the first gob, but in a way that distinguishes the final product from vessels or articles fabricated in generally the same manner using the same mold(s) owing to the randomness with which the second glass was applied over the partially-inflated first gob.

In some implementations, the pre-form and finish molds are actually the same physical mold which, when used in a "pre-forming" step is referred to as a "pre-form mold" and, when used in a "finish-molding" step is referred to as a "finish mold." In fabricating a more complex glass vessel, such as a bottle including a neck, the use of physically distinct pre-form and finish molds facilitates intermediate shaping, thereby obviating logistical difficulties and diminished quality attendant to the use of a single mold at two different stages of the process in order to form the first and second gobs into the final shape desired. Although the summation of the process to this point has implied molding in two stages, it will be generally appreciated that implementations prescribing more than two molding steps are also within the scope of the invention as defined in the claims. More specifically, even in implementations involving three or more molding steps, at least one such step (e.g., the first molding step) is regarded as a pre-forming step involving a pre-form mold, while at least one other step (i.e., the final molding step) is regarded as a finish molding step involving a finish mold.

In alternative implementations, apparatus controlled by a programmable computer are variously utilized in the performance one or more steps. For instance, the use of a computer-controlled pneumatic injector is particularly useful in ensuring that the quantity and pressure of gas injected into the mold is appropriate, precise and selectively tunable. Additionally, at least one multi-piece mold can be opened and closed by computer-controlled pneumatics, hydraulics or motor-actuated linkages. While human involvement is integral to the implementation of some versions, particularly at the gob-gathering and mold-filling stages—where an artisan's vision and skill might be desired in alternative versions, even one or more of the steps prior to introduction of the gob into either the pre-form mold, or the introduction of the pre-form vessel into the finish mold, is performed by computer-controlled apparatus.

Representative, non-limiting implementations are more completely described and depicted in the following detailed description and the accompanying drawings.

BRIEF DESCRIPTION OF THE DRAWINGS

FIG. 5A depicts the open pre-form mold and the injection of gas to force the molten gob to assume a non-final shape defined by the pre-form mold, although the pre-form mold would not be open when gas is injected;

FIG. 5B shows a non-finally-shaped pre-form vessel after removal from the pre-form mold;

FIG. 5C depicts the non-finally-shaped pre-form vessel of FIGS. 5A and 5B situated in an open finish mold;

FIG. 6 shows the finish mold of FIG. 5C in a closed position so that gas can be introduced to finalize the basic shape of the pre-form vessel of FIGS. 5A-5C.

DETAILED DESCRIPTION

The following description of methods of fabricating a multi-tone glass vessel is demonstrative in nature and is not intended to limit the invention or its application of uses. The various implementations, aspects, versions and embodiments described in the summary and detailed description are in the nature of non-limiting examples falling within the scope of the appended claims and do not serve to maximally define the scope of the claims.

In conjunction with FIGS. 1 through 7, there are described alternative illustrative methods of fabricating a multi-tone glass vessel from at least two disparately-colored molten-glass gobs. With initial reference to FIG. 1, a molten-glass first gob 20a of first glass $G_1$ of a first color $C_1$ is gathered around the distal end 12 of an elongated gathering implement 10 and extracted from a furnace 15. The gathering implement 10 is manipulated in order to give the first gob 20a a generally ellipsoidal shape.

Figure 1:
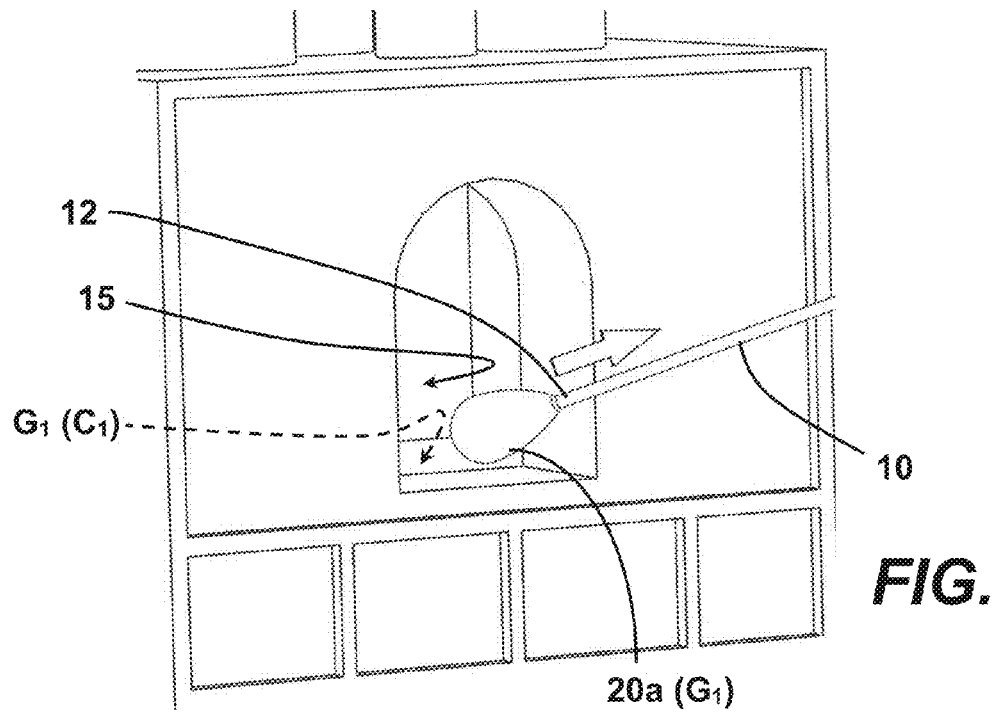
FIG. 1 depicts a molten-glass first gob being extracted from a glass furnace.
Figure 2:
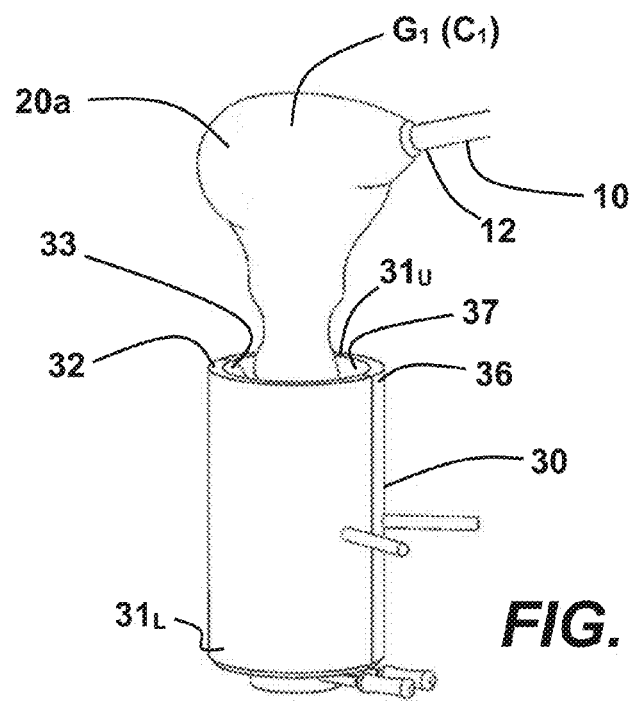
FIG. 2 shows the molten-glass first gob of FIG. 1 being deposited into an open-top vessel-defining pre-form mold.

The illustrative implementations described with reference to FIGS. 1 through 7 prescribe multi-stage molding processes, each of which includes, as shown in FIG. 2, the introduction of the molten-glass first gob 20a into a pre-form mold 30. With temporary additional reference to FIG. 5A, the illustrative pre-form mold 30 first shown in FIG. 2 includes first and second mold portions 32 and 36 with, respectively, first and second interior walls 33 and 37. When the first and second mold portions 32 and 36—which are hingedly joined in the example depicted—are brought into mutual contact, the first and second interior walls 33 and 37 define an internal pre-shaping cavity 38. In the illustrative version depicted, the pre-shaping cavity 38 is configured to define a pre-form vessel 50.

Figure 3:
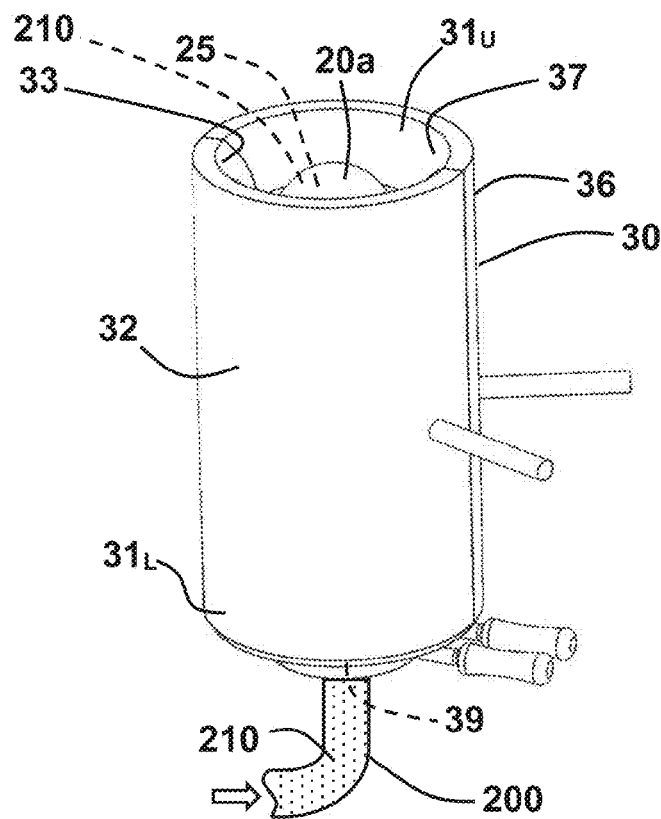
FIG. 3 depicts the partial inflation, and upward expansion, of the first gob of FIG. 2 as a gas is introduced into a lower end of the pre-form mold.

With continued reference to FIG. 2, and additional reference to FIG. 3, with the molten-glass first gob 20a deposited in the pre-form mold 30, a pneumatic injector 200 injects an initial quantity of gas 210 into the pre-form mold 30 through an opening 39. The pre-from mold 30 is vertically oriented such that molten glass is introduced through an open upper end $31_U$ thereof and the opening 39 through which the gas 210 is introduced is at a lower end $31_L$ opposite the upper end $31_U$. The injection of an initial quantity of gas 210 through the opening 39 in the lower end $31_L$ forms a gob cavity 25 within the first gob 20a. Filling the gob cavity 25 with gas 210 causes the first gob 20a to inflate and rise toward the open upper end $31_U$ of the pre-form mold 30.

Figure 4:
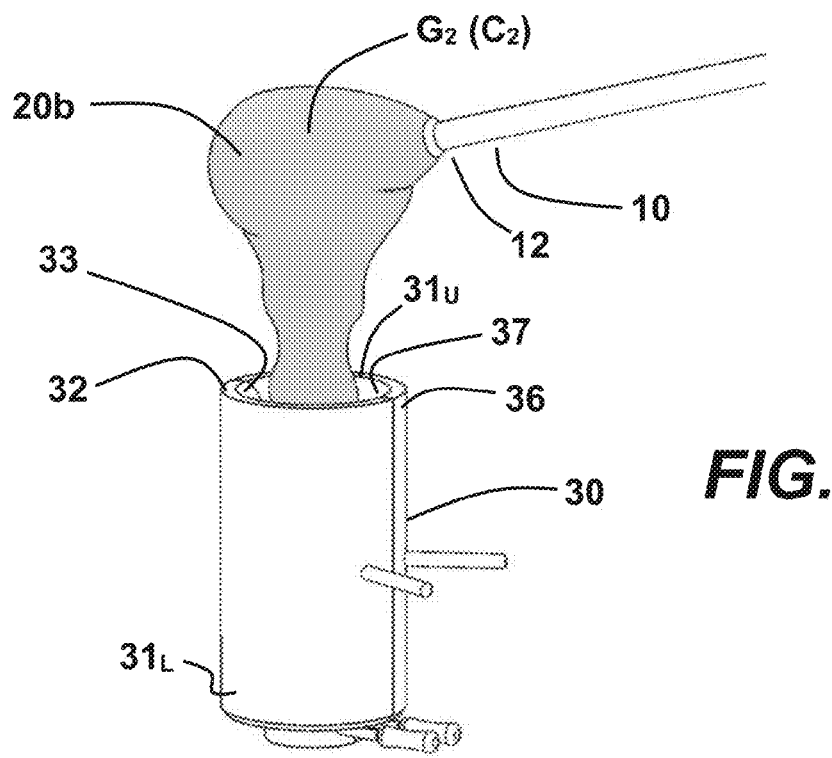
FIG. 4 illustrates the deposition of a molten-glass second gob, contrasting in color with the first gob of FIGS. 1-3, on top of the partially-inflated first gob within the pre-form mold of FIGS. 1 and 2.

Referring to FIG. 4, when the partially-inflated first gob 20a has assumed a predetermined shape and size, as in FIG. 3, for example, a molten-glass second gob 20b of a second glass $G_2$ and second color $C_2$, disparate from the first color $C_1$, is deposited into the pre-form mold 30 over the partially-inflated first gob 20a. As indicated by the manner in which the molten-glass second gob 20b is being introduced through the open upper end $31_U$ of the pre-form mold 30 in FIG. 4, the second gob 20b is permitted to flow freely and somewhat randomly over the partially-inflated first gob 20a under the drawing force of gravity. In this way, even in implementations in which the final overall product is of repeatable shape with the aid of one or more molds, the second gob 20b in each case will be "smeared" or "pressed" over the first gob 20a in a way that distinguishes the final product from vessels or articles fabricated in generally the same manner using the same mold(s). With the second gob 20b disposed on top of the first, partially-inflated gob 20a, an additional, second quantity of gas 210 is introduced into the pre-form mold 30. The internal gas pressure is elevated sufficiently to form the gobs 20a and 20b into a single pre-form vessel 50. While the formation of the gobs 20a and 20b into a pre-form vessel 50 is shown in FIG. 5A with the pre-form mold 30 depicted in an open position, this is only to facilitate explanation; it is to be understood that the introduction of additional gas 210 into the pre-form mold 30 actually occurs while the first and second mold portions 32 and 36 are in mutual contact (i.e., while the pre-form mold 30 is closed), as in FIG. 3.

When the pre-form vessel 50 is sufficiently cool and "self-supporting" to retain its basic shape, the pre-form mold 30 is opened and the non-finally-shaped pre-form vessel 50 is removed, as shown in, respectively, FIGS. 5A and 5B. The illustrative pre-form vessel 50 of FIG. 5B has a pre-form vessel wall 52 defining a pre-form vessel exterior surface 54 and a pre-form vessel interior surface 56 defining a pre-form vessel cavity 57. Moreover, the disparately-colored first and second glasses $G_1$ and $G_2$ have been mutually fused into a unity structure (the pre-form vessel 50). In the illustrative implementation under consideration, the heated pre-form vessel 50 of FIG. 5B is transferred from the pre-form mold 30 to a finish mold 70. The illustrative finish mold 70 of FIG. 5C includes first and second mold pieces 72 and 76 having, respectively, first and second inside walls 73 and 77. When the first and second mold pieces 72 and 76 are urged into mutual contact to seal the finish mold 70, the first and second inside walls 73 and 77 define an internal finish-shaping cavity 78.

As shown in FIG. 6, in a manner analogous to that associated with shaping in the pre-form mold 30, a quantity of gas 210 is injected into the closed finish mold 70, and into the pre-form vessel cavity 57, through a pneumatic injector 200 in order to impart to the pre-form vessel 50 its final shape and form it into what is subsequently regarded as a finished vessel 80. After shaping in the finish mold 70, the finish mold 70 is opened in the general manner shown in FIG. 5C, and the finished vessel 80 is removed.

Figure 7:
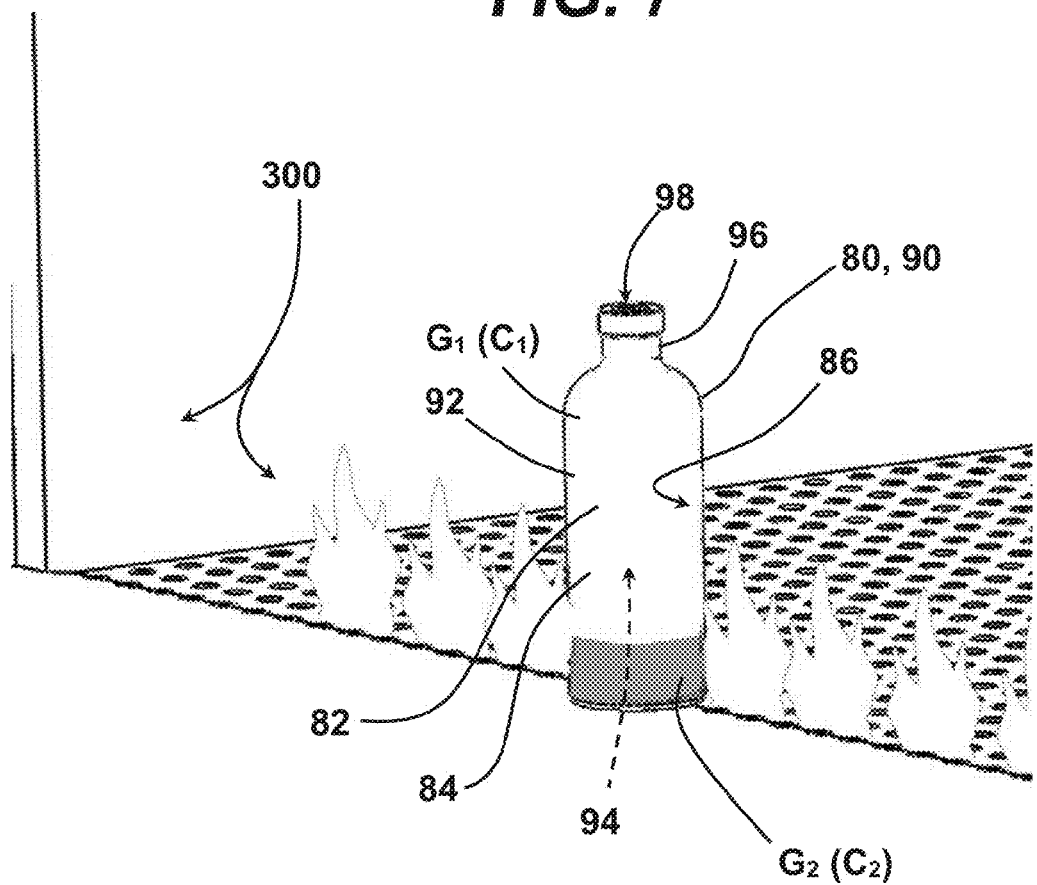
FIG. 7 illustrates the feeding into an annealer a finished vessel resulting from the molding step associated with FIG. 6.

As shown in FIG. 7, an illustrative finished vessel 80 is being fed through an annealer 300 in order to cool the glass in a controlled manner and prevent internal stresses that might cause the glass to crack if it is allowed to cool too quickly. The finished vessel 80 has at least one vessel wall 82 defining finished vessel exterior and interior surfaces 84 and 86. As with the pre-form vessel 50 shown in FIG. 5B, the finished vessel 80 exhibits a two-tone pattern including the mutually fused first and second glasses $G_1$ and $G_2$ of, respectively, first and second colors $C_1$ and $C_2$. It should be noted that, while the delineation between the first and second glasses $G_1$ and $G_2$ is depicted as relatively even and "clean" for illustrative purposes, in various implementations, the delineation is actually somewhat unpredictably "smeared," thereby imparting to each finished vessel 80 unique attributes by which it can be distinguished from other vessels 80 produced in accordance with the same general process in the same molds.

As previously explained, alternative implementations involve the use of either (i) a single mold in temporarily separate "pre-forming" and "finish-molding" steps or (ii) two or more physically distinct molds in "pre-forming" and "finish-molding" steps. As a general observation, more intricate final products call for molding in at least two stages with at least two physically distinct molds. For instance, while the formation of a vessel such as a drinking cup might be pre-formed and finish molded in a single physical mold, and perhaps even in a single molding step, a vessel such as a bottle might call for physically distinct pre-form and a finish molds.

The particular illustrative finished vessel 80 of FIG. 7 is a bottle 90 which has a main body 92 defining an internal storage cavity 94 and a neck 96 depending from the body 92. The neck 96 is narrow relative to the main body 92 and has a neck opening 98 (or channel) extending therethrough that renders the storage cavity 94 in fluid communication with the exterior of the bottle 90. It will be appreciated that the formation of a relatively narrow neck 96 might best be performed in a multi-stage molding process with at least two physically distinct molds. This is particularly true when the neck 96 and the neck opening 98 must be fabricated within "tight" or relatively unforgiving tolerances, as when the bottles 90 being produced are to be sealed by standardized closures such as caps or plugs (not shown).

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. A method of fabricating a multi-tone glass vessel of predetermined shape, the method comprising:
    depositing a molten-glass first gob of a first color into a mold having a lower end and an open upper end opposite the lower end, the mold being vertically oriented, and the lower and upper ends being defined relative to the gravitational field, such that gravity draws deposited molten glass toward the lower end;
    introducing an initial quantity of gas into the lower end of the mold in order to form a gob cavity within the first gob and cause the first gob to partially inflate and expand toward the upper end of the mold;
    depositing a molten-glass second gob into the mold over the partially-inflated first gob such that (i) the second gob flows freely and randomly over the partially-inflated first gob under the drawing force of gravity in order to create randomized, non-molded flow patterns of the second glass upon the partially-inflated first gob and (ii) the partially-inflated first gob is situated between the second gob and the lower end of the mold, the second gob being of a second color contrasting with the first color; and
    introducing a second quantity of gas into the gob cavity within the mold in order to form the first and second gobs into a single, multi-tone vessel of predetermined shape.

2. The method of claim 1 wherein the vessel is a bottle having a main body defining an internal storage cavity and a neck depending from the body, the neck being narrow relative to the main body and having an opening extending therethrough that renders the storage cavity in fluid communication with the exterior of the bottle.

3. The method of claim 2 wherein the multi-tone vessel is two-tone.

4. The method of claim 1 wherein the multi-tone vessel is two-tone.

5. A method of fabricating a multi-tone glass vessel of predetermined shape, the method comprising:
    depositing a molten-glass first gob of a first color into a pre-form mold having a lower end and an open upper end opposite the lower end, the pre-form mold being vertically oriented, and the lower and upper ends being defined relative to the gravitational field, such that gravity draws deposited molten glass toward the lower end;
    introducing an initial quantity of gas into the lower end of the pre-form mold in order to form a gob cavity within the first gob and cause the first gob to partially inflate and expand toward the upper end of the pre-form mold;
    depositing a molten-glass second gob into the pre-form mold over the partially-inflated first gob such that (i) the second gob flows freely and randomly over the partially-inflated first gob under the drawing force of gravity in order to create randomized, non-molded flow patterns of the second glass upon the partially-inflated first gob and (ii) the partially-inflated first gob is situated between the second gob and the lower end of the pre-form mold, the second gob being of a second color contrasting with the first color;
    introducing a second quantity of gas into the gob cavity within the pre-form mold in order to form the first and second gobs into a single, multi-tone pre-form vessel having at least one pre-form vessel wall defining a pre-form vessel cavity;
    removing the pre-form vessel from the pre-form mold;
    introducing the pre-form vessel into a finish mold; and injecting a quantity of gas into the pre-form vessel cavity within the finish mold in order to form the pre-form vessel into a finished vessel.

6. The method of claim 5 wherein at least the finish mold is configured to define a neck portion with a neck opening in the finished vessel.

7. The method of claim 6 wherein the finished vessel is a bottle.

8. The method of claim 5 wherein the finished vessel is a bottle.

9. The method of claim 8 wherein the multi-tone vessel is two-tone.

10. The method of claim 5 wherein the multi-tone vessel is two-tone.

11. The method of claim 10 wherein the finished vessel is a bottle having a main body defining an internal storage cavity and a neck depending from the body, the neck being narrow relative to the main body and having an opening extending therethrough that renders the storage cavity in fluid communication with the exterior of the bottle.

* * * * *